(12) United States Patent
Reincke

(10) Patent No.: US 7,908,983 B2
(45) Date of Patent: Mar. 22, 2011

(54) SOWING DEVICE FOR LAWNS

(75) Inventor: Marinus Reincke, Leersum (NL)

(73) Assignee: Maredo B.V., Leersum (NL)

( * ) Notice: Subject to any disclaimer, the term of this patent is extended or adjusted under 35 U.S.C. 154(b) by 0 days.

(21) Appl. No.: 12/225,289

(22) PCT Filed: Oct. 10, 2007

(86) PCT No.: PCT/NL2007/000257
§ 371 (c)(1),
(2), (4) Date: Sep. 17, 2008

(87) PCT Pub. No.: WO2008/063050
PCT Pub. Date: May 29, 2008

(65) Prior Publication Data
US 2010/0089296 A1 Apr. 15, 2010

(30) Foreign Application Priority Data
Nov. 22, 2006 (NL) ...................................... 1032918

(51) Int. Cl.
| | |
|---|---|
| A01C 5/00 | (2006.01) |
| A01C 7/00 | (2006.01) |
| A01C 7/08 | (2006.01) |
| A01C 9/00 | (2006.01) |
| A01C 17/00 | (2006.01) |

(52) U.S. Cl. ........................ 111/130; 111/167; 111/178

(58) Field of Classification Search .......... 111/130–133, 111/11–14, 149, 157–170, 177, 178
See application file for complete search history.

(56) References Cited

U.S. PATENT DOCUMENTS
3,247,812 A  4/1966  Alfred
6,651,570 B1  11/2003  Thiemke

FOREIGN PATENT DOCUMENTS
FR  2 703 877 A1  10/1994
NL  7 314 578 A  6/1974

*Primary Examiner* — Christopher J. Novosad
(74) *Attorney, Agent, or Firm* — Charles A. Muserlian

(57) ABSTRACT

A device for sowing seed, fertilizer in an existing lawn, comprising:
  a chassis,
  a movement system, fitted to the chassis, to move the device across the ground in a certain direction,
  a bearing-mounted pin disk in the chassis around a horizontal axis,
  a seed dosing device which doses the seed to be sown accurately and according to an adjustable amount,
  a guiding plate which at the bottom pushes the existing grass forward in the direction of the movement and at the top distributes the dosed seed in rows and sends the seed to the pin disk,
wherein the pin disk collects the dosed seed from the guiding plate and plants the seed in the soil underneath the lawn during rotation.

9 Claims, 3 Drawing Sheets

SOWING DEVICE FOR LAWNS

The application is a 371 of PCT/NL2007/000257 filed Oct. 10, 2007.

The invention claims to improve the germination percentage, reduce damage to the existing lawn and reduce the nuisance of the grass stalks. This is realized by first guiding the seed to the correct position by means of a funnel and by subsequently lifting it up with a rotating pin disk and pushing it into the soil. The seed is set into the soil. The grass stalks of the existing lawn are pushed forward into the direction of the flow, so as to reduce their interference with the sowing process to a minimum. Apart from the fact that the seed is set into the soil at the correct depth, the seed is actually pushed against the soil. This direct contact with the soil improves germination of the seed. After all, if the seed is sown into a prepared hole or trench, contact with the soil will be small. It is important for the seed to be pushed against the soil so it can absorb moisture from the soil, germinate and take root.

As it is not always easy to press a pin disk into the soil due to its dead weight, the device is fitted with various pin disk combinations which have been bearing-mounted around cams that are attached—in a certain order—to the drive shaft in the horizontal plane. The pin disk rolls across the soil and is moved eccentrically in the vertical plane by means of the drive from the drive shaft with cams. This forward and backward eccentric movement will considerably improve the level of penetration of the pin disk, push the grass seed into the ground and bring it into contact with the soil, the pin disk may be exchangeable.

The invention is to be described by means of the non-exhaustive operation example, represented in the following figures, where:

Figure 1:
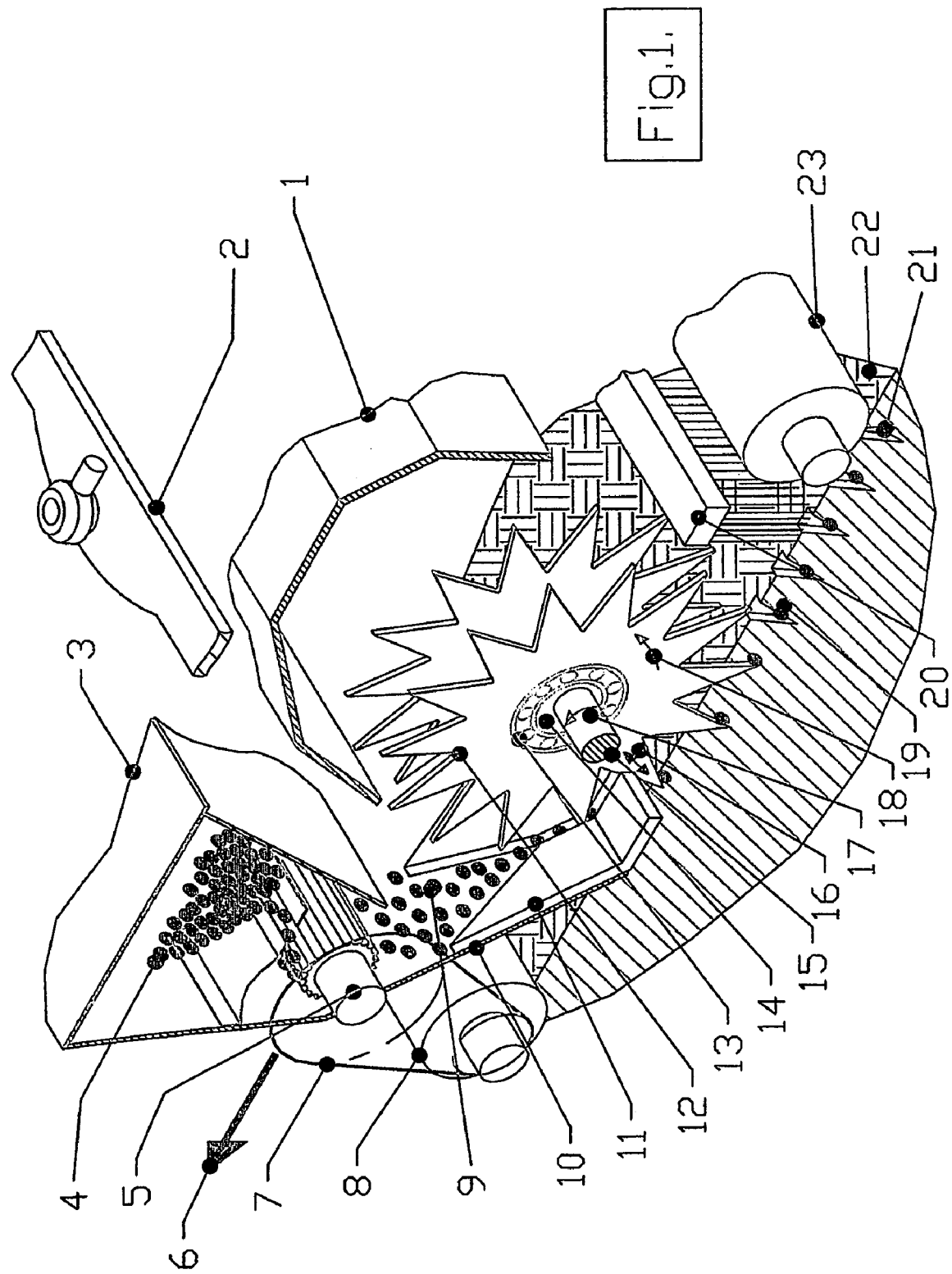
FIG. 1 is a perspective, partly cut-away side view of the sowing device, according to a preliminary operation model of the invention.

FIG. 1 gives a perspective view of the sowing device. The device comprises a main chassis (1) with a non-limitative mounting clamp (2), which is used to attach the device to a driving vehicle. The sowing device is available in different models, making it possible to attach it to a host of different driving vehicles.

The sowing tray (3) is filled with seed (4). The dosing shaft (5) distributes the seed equally across the entire width. The dosing shaft (5) is driven by means of a supporting roller (8). By changing the transmission ratio of the drive (7), the extent of the grass seed dose can be changed. The seed (9) which has been dosed across the entire width then slides down along the guiding plate (10) and is distributed in rows by the funnel plates (11).

A number of cams (14) have been fixed solid and into a certain order onto the driven main shaft (15). Bearings (13) have been mounted around these cams. The pin disk (12) is linked to these bearings. The pin disk (12) can roll across the ground freely. In other words, if the device moves forward across the ground at a certain speed (6), the peripheral velocity (18) of the pin disk (12) will assume a similar speed. However, as soon as the main shaft (15) is driven (17), the pin disk (12) will also move eccentrically backwards and forwards (16) in the vertical plane. This eccentric movement causes the pin disk to vibrate, resulting in better penetration and the seed being pushed into the soil.

The pin disk (12) that vibrates in the vertical plane and rotates around the horizontal shaft collects the seed (9) which has been distributed in rows by the funnel plates (11). If the speed of rotation (18) of the pin disk exceeds the fall velocity of the seed (9), the seed (9) will be picked up by one of the pins of the pin disk (12). The pin disk continues to rotate, and both the pin and the seed are pushed into the soil (19), pressed against one side of the hole. An optional brush (20) can finish things off. A supporting roller (23) adjusts the device to the ground at the back. This supporting roller also closes up the prepared holes (21) so that one can hardly tell that seed has been sown on the lawn (22).

Figure 2:
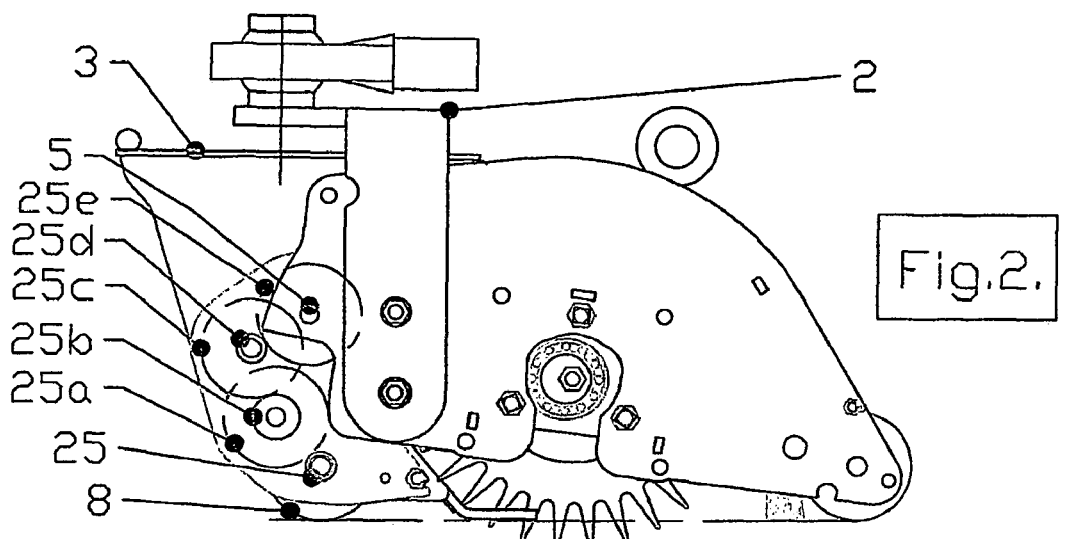
FIG. 2 is a side view.

FIG. 2 gives a side view. The self-supporting sowing device can be attached to a driving vehicle by means of the mounting clamp (2). The supporting roller (8) drives the dosing shift by means of gear transmission. Gear wheels 25, 25*a*, 25*b*, 25*c*, 25*d* and 25*e* are easily exchangeable, thus making it possible to change the amount of seed per meter covered.

Figure 3:
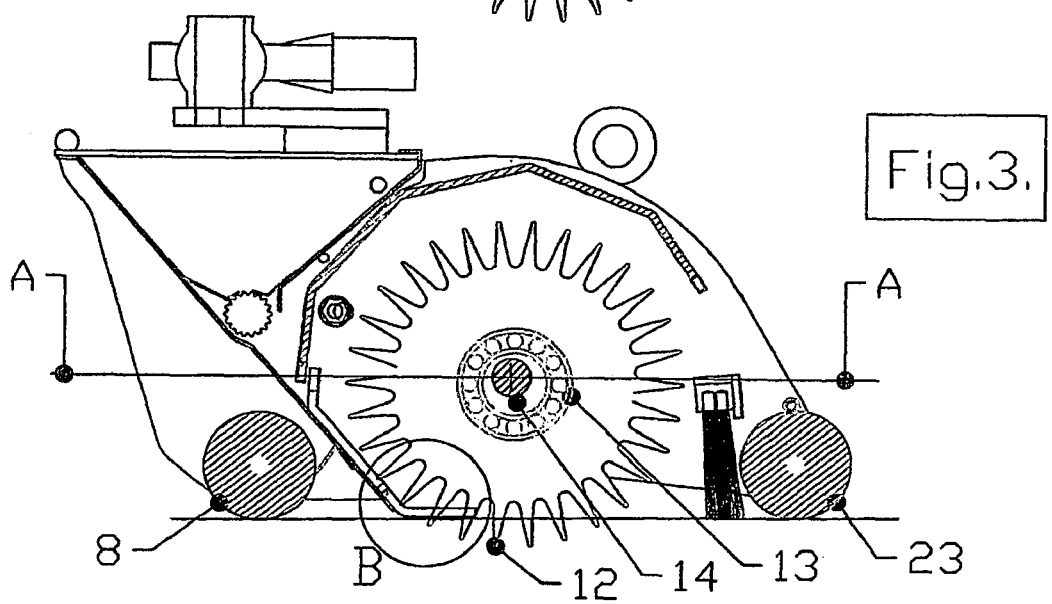
FIG. 3 is a schematic cross section of FIG. 1.

FIG. 3 shows a cross section. The supporting rollers (8 and 23) adjust the device to the ground. The insertion depth D, FIG. 3, of the pin disk (12) can be changed by adjusting the supporting rollers (8 and/or 23).

Figure 4:
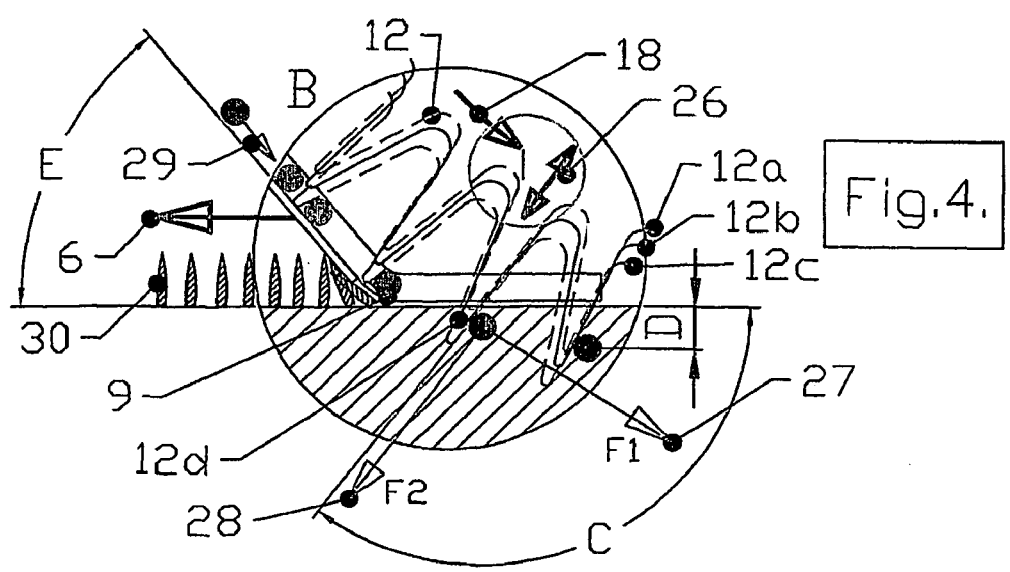
FIG. 4 shows a schematic detail B of the pin disk which puts the seed into the soil through eccentric movement.
Figure 5:
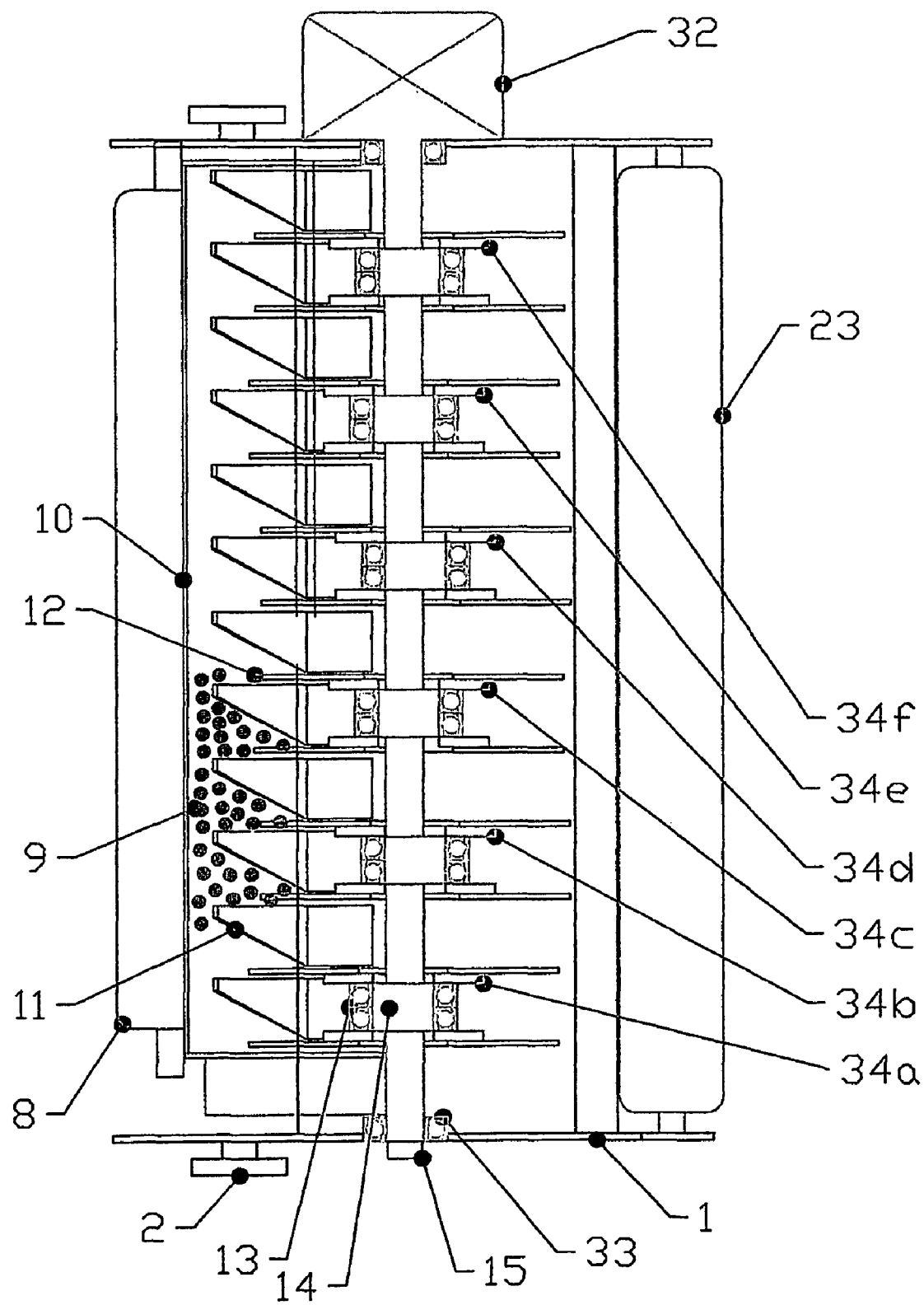
FIG. 5 shows a schematic bird's eye cross section AA from FIG. 3.

FIG. 4 gives a blown up version of detail B from FIG. 3. It also includes the vibrating movement of the pin disk (12). The driven cam (14) (FIG. 13) eccentrically moves the pin disk (12) backwards and forwards in the vertical plane between the outer ends (12*a* and 12*c*). When the pin (2*d*) goes in, the eccentric movement (26) will exert a force (27 and 28) on the seed. Force 27 ensures that the seed comes into contact with the soil, while force 28 pushes the seed into the soil, as angle C is larger than 90 degrees. Ultimately, the seed will become "stuck" at depth D. Depth D depends on the soil conditions, the positions of the supporting rollers (8 and 23) and the size and shape of the seed (9). When driving forward at speed (6), the peripheral velocity (18) of the pin disk (12) will assume the same value. After all, the bearing-mounted pin disk (12) to exceed the seed's fall velocity (29). To change the fall velocity (29) of the seed, angle E can be changed. This setting is important, because the size, shape and weight of the seed can differ and ultimately determine the fall velocity (29).

The invention claimed is:

1. A device for sowing seed, fertilizer in an existing lawn, comprising:
   a chassis,
   a movement system, fitted to the chassis, to move the device across the ground in a certain direction,
   a bearing-mounted pin disk in the chassis around a horizontal axis,
   a seed dosing device which doses the seed to be sown accurately and according to an adjustable amount,
   a guiding plate which at the bottom pushes the existing grass forward in the direction of the movement and at the top distributes the dosed seed in rows and sends the seed to the pin disk,
   wherein the said pin disk collects the dosed seed from the guiding plate and plants the seed in the soil underneath the lawn during rotation.

2. A device according to claim 1, wherein the pin disk vibrates in a vertical plane.

3. A device according to claim 1, wherein the pin disk is bearing-mounted around a cam that is fixed on a horizontal axis.

4. A device according to claim 3, wherein the device comprises several pin disk combinations which are mounted on the horizontal drive shaft in a fixed order.

5. A device according to claim 1, wherein the pin disks are exchangeable.

6. A device according to claim 1, wherein the speed of rotation of the dosing roll is changeable.

7. A device according to claim 6, wherein the speed of rotation of the dosing roll determines the dosing volume of the seed.

8. A device according to claim 1, wherein the guiding plate pushes the grass stalks forwards and down.

9. A device according to claim 8 wherein the guiding plate is at an angle adjustable in relation to the ground.

* * * * *